Figure 1:
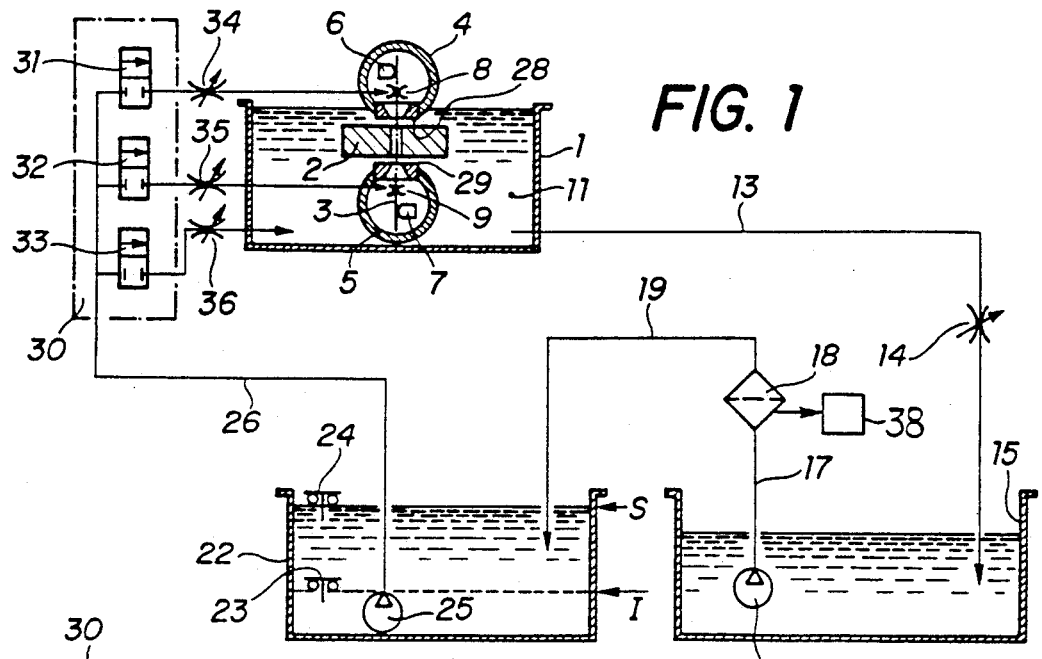

United States Patent [19]

Corcelle et al.

[11] Patent Number: 5,071,567
[45] Date of Patent: Dec. 10, 1991

[54] INSTALLATION AND PROCESS FOR FILTRATION OF A MACHINING LIQUID IN A CONTINUOUS SUPPLY CIRCUIT

[75] Inventors: François Corcelle, Thoiry, France; Omar Moussli, Petit-Lancy, Switzerland

[73] Assignee: Charmilles Technologies S.A., Meyrin, Switzerland

[21] Appl. No.: 517,417

[22] Filed: May 1, 1990

Related U.S. Application Data

[63] Continuation of Ser. No. 229,121, Aug. 5, 1988, abandoned.

[30] Foreign Application Priority Data

Aug. 13, 1987 [CH] Switzerland .......................... 3140/87

[51] Int. Cl.$^5$ ............................................. B01D 29/62
[52] U.S. Cl. ....................................... 210/744; 210/87;
210/116; 210/143; 210/167; 210/171;
210/195.1; 210/407; 210/508; 210/739;
210/791; 210/805
[58] Field of Search ....................... 210/86, 87, 90, 91,
210/98, 104, 106, 111, 124, 126, 137, 138, 141,
143, 167, 171, 172, 195.1, 196, 253, 257.1, 307,
332, 334, 340, 341, 356, 386, 490, 500.1, 506,
508, 741, 791, 805, 806, 116, 128, 744, 407;
219/69.14

[56] References Cited

U.S. PATENT DOCUMENTS

| | | | |
|---|---|---|---|
| 3,623,612 | 11/1971 | Ernst | 210/356 |
| 3,670,898 | 6/1972 | Fournier | 210/356 |
| 4,317,732 | 3/1982 | Shoquist | 210/106 |
| 4,478,714 | 10/1984 | Blake et al. | 210/340 |
| 4,584,450 | 4/1986 | Inoue | 210/685 |
| 4,608,180 | 8/1986 | Caro | 210/791 |
| 4,618,431 | 10/1986 | Hindman et al. | 210/110 |
| 4,628,170 | 12/1986 | Furukawa | 219/69.14 |
| 4,772,402 | 9/1988 | Love | 210/195.1 |

Primary Examiner—W. Gary Jones
Assistant Examiner—Matthew O. Savage
Attorney, Agent, or Firm—Gifford, Groh, Sprinkle, Patmore and Anderson

[57] ABSTRACT

An apparatus and method for continuously supplying and recycling machining liquid in an EDM device employ a filter between a liquid reservoir and a machining location at which the liquid is used. In one embodiment of the invention a buffer reservoir is provided between the filter and the machining location, while in another embodiment a second filter is connected in parallel with the first-mentioned filter. In either case, an assured alternative supply of filtered liquid is provided while the filter is repeatedly stopped and started in response to one or more operating parameters representing a degree of filter clogging. The stopping of the partially-clogged filter unexpectedly permits self-regeneration of the filter without the need for dismounting or backflushing for cleaning; even though cleaning is not performed, the repeated stopping by itself extends the useful life of the filter.

7 Claims, 1 Drawing Sheet

INSTALLATION AND PROCESS FOR FILTRATION OF A MACHINING LIQUID IN A CONTINUOUS SUPPLY CIRCUIT

This is a continuation of copending application Ser. No. 07/229,121 filed on Aug. 5, 1988, now abandoned.

The invention concerns an installation and a process for filtering and recycling a machining liquid in a continuous supply circuit. The machining liquid of a machine for machining, in particular an electrical discharge machining machine, designated "EDM machine" from here on, becomes progressively contaminated during machining by machining residues and, in particular, in the case of an EDM machine, by metal particles due to erosion of the electrodes so that the conductivity of the liquid is thereby affected. To keep this contamination within acceptable limits, it is a known technique in EDM to continuously recycle the machining liquid by transferring the used liquid from the machining tank to a tank where it is allowed to settle, then filtering it and injecting it again, either into the tank or directly into the machining zone or into certain critical zones, for example close to the guides supporting the wire or the contacts where the current is fed in. The machining liquid is in general a dielectric liquid.

The filters commonly used are, in most cases, devices arranged to allow the liquid to flow in one direction only; they are discarded once they become clogged in contrast to other types of filters that are cleared by reversing the direction of liquid flow. They are made of paper or plastic. In these filters, a system for recovery of the particles that have settled may be provided. These filters clog up after a certain time. This progressive clogging reduces the flow of filtered liquid to such an extent that there is a risk that it will no longer be possible to ensure correct injection of the liquid in the working zone, which would necessitate interrupting machining. These filters must then be replaced, which requires action by an operator. The higher the machining rate the faster this clogging occurs. To increase the capacity of the EDM machine for unattended operation (to allow it, for example, to run for a whole weekend), it is therefore of interest to prolong the useful life of the filters as much as possible.

The aim of the invention is to increase the useful life of one-way flow filters used on EDM machines both for cutting by means of a wire and for die sinking.

Unexpectedly, the tests carried out by the applicant have in fact shown that this life is notably extended by successively stopping the circulation of liquid through the filters, these rest periods apparently allowing their self-regeneration. Each time the system is put back into operation after these interruptions, the pressure drop across the filter is less than it's value at the moment of interruption—the filter appears to have cleared itself. This remarkable effect may be still further increased for a paper filter, which is of a spongy nature, by giving the upstream side of the filter a composition that limits the adhesion or incrustation of particles, for example by impregnating this face with a polymer. When this pressure drop again reaches a critical level, it is possible, depending on the particular cases, either to interrupt the operation of the filter or to put it out of operation definitively. The useful life obtained in this way is greater than that of a filter operating continuously.

The installation and the method of supply and regeneration of the machining liquid of this invention allows successive stopping of the operation of the filters without having to interrupt machining.

Figure 3:
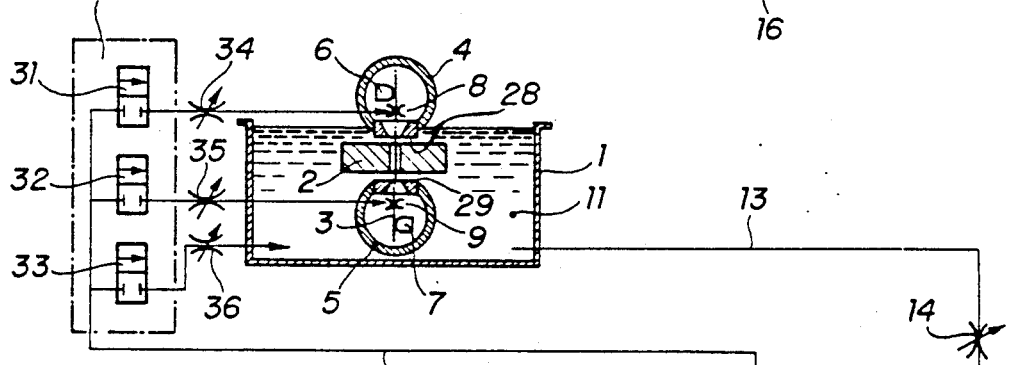
Figure 3:
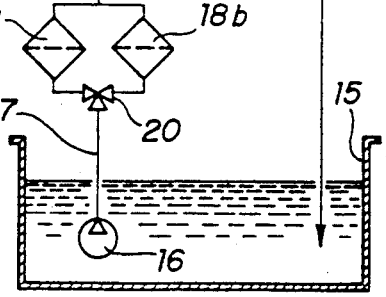

This invention may have numerous variants or forms of execution. It will now be illustrated in more detail by the description, by way of example, only two of the ways in which it can be realized, shown schematically in the accompanying drawings in which FIG. 1 schematically illustrates a first variant of the invention, realized on an EDM machine, FIG. 2 is a diagram of the pressure drop across a filter as a function of time, and FIG. 3 schematically illustrates a second way of realizing the invention.

Figure 2:
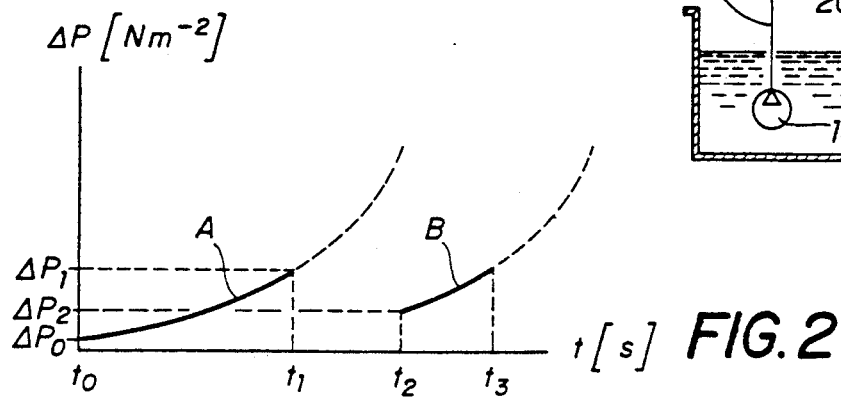

The installation represented in FIG. 1 uses a filter unit having a flow rate greater than the average consumption of machining liquid by the EDM machine. This makes it possible to produce a reserve supply of filtered liquid, ready for re-use, in a buffer reservoir located downstream of this filter unit. It is this reserve supply that will supply the machining zone during the intermittent stoppings of filtration. The reference number 1 designates the machining tank of an EDM machine used for cutting by electrical discharge machining a workpiece 2 by means of an electrode wire 3. For improved clarity, most of the EDM machine has been omitted from the drawing and the schematic sections 4 and 5 of the upper and lower machining heads are not to scale but considerably enlarged. Each head contains a contact 6, 7 for the current supply to the wire, a wire guide 8, 9 and a nozzle 28, 29. During machining of the workpiece 2, the dielectric liquid 11 is gradually contaminated by the eroded particles and its own decomposition products. Maintaining contamination and the conductivity of the machining liquid at an acceptable level is carried out in a closed circuit. The used liquid is drawn off from the tank 1 by a pipe 13 which leads, via a flow control device 14, to a tank or reservoir 15. A pump 16 located in this tank sends the liquid to be filtered by a pipe 17 through a filter 18 preferably a conventional spongy paper filter as described earlier, having an upstream face impregnated with a polymer, connected at its outlet to a pipe 19 which then leads the liquid to a buffer reservoir 22. The installation can be provided with a device 38 of conventional construction for the removal of such particles which have settled at the bottom of the filter 18. The pump 16, the filter 18 and the pipes 17 and 19 are dimensioned so as to obtain a flow through the filter, even when it is partially clogged, that is greater than that necessary to continuously supply the tank 1 and the various injection circuits of the machining heads 4 and 5 with regenerated liquid. Therefore, it is possible to interrupt the operation of the pump 16 and consequently of the filter 18, from time to time, without interupting the supply of filtered liquid to the tank, provided that there is a sufficient reserve supply of liquid in the buffer reservoir 22 arranged downstream of the filter 18. This reserve supply is constituted by the volume between the two levels I and S of the reservoir 22, determined by two level indicators 23 and 24. These indicators may, for example, be moving floats, in particular of cork, each operating a switch.

A pump 25, located below the level I, is connected by a pipe 26 to a distribution unit 30 comprising three liquid distributors 31, 32, 33 which inject the filtered liquid, via three flow controllers 34, 35, 36, at various places inside the tank and to the machining heads. In the drawing, the distributors 31 and 32 supply the machining heads 4 and 5 and the injection nozzles 28 and 29 while the distributor 33 injects liquid directly into the tank 1, but other configurations are possible, for example, the providing of liquid to wet and lubricate the contacts 6 and 7, a special injection device to facilitate the rethreading of the wire of a wire EDM machine, and so on.

The buffer reservoir 22 can present two compartments, one for the filtered liquid and the other for the contaminated liquid, the last compartment communicating with the tank 15 by a semi-rigid pipe, for example. The overflow of filtered liquid can cant up in the compartment of liquid to be filtered.

Electronic control units (not shown in the drawing) control the circulation of the liquid according to the following principle: when the low level indicator 23 indicates that the level of the liquid in the reservoir 22 has fallen below the level I, the pump 16 is started. Since this pump supplies liquid at a greater rate than it is used by the EDM machine, the level in the reservoir 22 rises until it reaches the level S, which activates the high level detector 24. A signal sent by this indicator causes the pump 16 to be stopped and from then on the flushing of the machining zone is supplied from the reserve supply of liquid accumulated between the levels S and I of the buffer reservoir 22. The level in this reservoir therefore falls until the level I is reached, which activates the low level indicator 23 which causes the pump 16 to be restarted so that the cycle is repeated.

The filter 18 will therefore operate intermittently according to the cycles determined by the volume of liquid between the levels I and S, the capacity of the filter, the extent to which it is clogged up, the consumption of the machine, the machining rate, etc. The pump 16 is also run for a certain time whenever the machining tank 1 is emptied, starting on detection of the opening of the drain flap and independently of the information from the floats 23 and 24. After this time, for example fifteen minutes, control of the pump is again taken over by the indicators 23 and 24 until the next machining operation. The tank 1 is filled thanks to another pump, located in the tank 15, and not shown by the drawings. The pressure drop across the filter can be measured via a differential pressure gauge, mounted at the entry of the filter 18 and not showed on the drawings. That measuring permits to inform the operator about the number of hours remaining before the completed clogging, for example thanks to adequate graphs.

The graph of FIG. 2 shows the variations with time t of the pressure drop $\Delta P$ across the filter. If a filter put into service at time $t_0$ has a pressure drop $\Delta P_0$ at that time, not will this increase with time but also will its derivative, i.e. the change in the pressure drop per unit time increases during operation. In other words, the more the filter becomes clogged the faster it will clog. This is indicated by the curve A, whose slope increases progressively with time. The pressure drop of the filter in continuous operation is indicated by the solid line of this curve and by its prolongation as a dotted line which rapidly attains values of $\Delta P$ that are unacceptable in practice. If operation of the filter is stopped at time $t_1$, (where the pressure drop is $\Delta P_1$) to be resumed at time $t_2$, the pressure drop $\Delta P_2$ then measured is appreciably lower than $\Delta P_1$. It is important to note that the increase in the pressure drop per unit time is also less than that at the time operation was stopped, which results in an additional gain. The pressure drop and its derivative then increase again as indicated by curve B and its extension as a dotted line. The control system of the installation can be arranged so as to stop operation of the filter again at a time $t_3$, for example when the pressure drop again reaches the value $\Delta P_1$ or, alternatively, when its derivative reaches some other predetermined threshold. The cycle may be repeated until the gain obtained by allowing the filter to rest for a while becomes too small.

Evidently, the program controlling the liquid circulation may be more complex and include special routines for the initial filling of the tank 15, variable delays for taking the inertia of the system into account, routines making use of the delays to warn the operator of the imminence of certain critical conditions and for automatically stopping machining when adequate flushing can no longer be ensured, etc. All these possibilities are well known in the art and will therefore not be described in more detail here, except for the monitoring of the extent to which the filter is clogged.

Similarly, the schematic diagrams of the drawings do not show certain essential but well-known components of the closed circuit supply system, such as the ion exchange demineralizer, which is preferably located so as to demineralize the filtered liquid of reservoir 22, and also such as the temperature probe and the coil for temperature exchange, both intended for the cooling of the machining liquid.

In the installation of FIG. 1, the clogging of the filter 18 should be monitored since it tends to progressively reduce the output of the pump 16 which should normally be much greater than that of the pump 25. However, as the filter 18 gradually clogs up, the output of the pump 16 falls and tends to approach that of the pump 25, so that filling the reservoir 22 takes longer and longer. To prevent the output of the pump 16 falling until it is equal to or even less than that of the pump 25 when the machine is operating unattended, it suffices to measure the time taken during the filling phase of the reservoir 22 for the level to rise from level I to level S, using the electrical signals produced by the indicators 23 and 24 and then, for each cycle, to compare this time with a maximum permissible value so that, if this time is exceeded, a warning signal indicates to the operator that the filter should be changed within a maximum of 12 hours, for example. All this can be realized without difficulty by a person skilled in the art using hard-wired logic circuits or a microprocessor, and has the advantage of eliminating the differential pressure gauge for monitoring the pressure drop P across the filter 18. A security device can be provided, which interrupts the machining when the operator has omitted to change the filters within the time-limit previously allowed.

FIG. 3 represents a second embodiment of the invention. In this figure, the components analogous to those of FIG. 1 have the same reference numbers as in FIG. 1 and will not be described again here. The essential difference between this form of execution and the one previously described is that here the single filter 18 of FIG. 1 is replaced by two filters 18a and 18b, and the buffer reservoir 22 with its ancillary equipment is eliminated. In addition, a valve 20 controlled (in a way not shown on the drawing) by an electronic control circuit, generally programmed, interrupts the flow of liquid to one and then the other of the filters 18a and 18b for determined intervals of time. This allows each of the two filters to have rest periods during which it regenerates itself while the other one takes care of the supply of filtered liquid to the EDM machine. Evidently, the simplest procedure is to cause the filters to operate alternatively, each in turn, but it may be advantageous to sometimes cause them both to operate simultaneously. Here, as everywhere else in the text, the expression "a filter" or "one filter" may represent both a single filter or a bank of several filters operating together as they are often used in this field.

Finally, it may be advantageous for practical reasons to combine the two methods of realization described here, i.e. to provide for two filters operating alternatively or semi-alternatively as well as a buffer reservoir after these filters. This give more freedom for the operator for replacing filters that are definitively clogged without interrupting machining and also when emptying and refilling the tank 1.

It should be added that the presence of a buffer reservoir makes it possible to maintain constant the pressure of injection of the machining liquid in the nozzles of the machining heads, since it no longer varies with the state of the filters, and also to increase the stability of machining by reducing, in particular, the risk of breakage of the electrode wire when the installation according to this invention is mounted on a wire-type EDM machine.

The installation described here may evidently be equipped with devices of known type such as components for measuring and regulating or causing changes in the conductivity of the machining liquid, changing its temperature, causing it to circulate through ions exchange resins, etc.

We claim:

1. An apparatus for the continuous supply and recycling of a machining liquid, comprising in combination:
   a reservoir for containing machining liquid;
   machining means for utilizing machining liquid;
   fluid circuit means connecting said reservoir to said machining means, said circuit means including a disposeable one-way flow filter made of paper, or of paper having a face impregnated with a polymer; and
   intermittent operating means for successively stopping and restarting operation of said filter in order to extend the life of said filter by successive rest periods, said intermittent operating means including auxiliary means for assuring continued supply of filtered liquid to said machining means while operation of said filter is stopped;
   wherein said auxiliary means comprises a buffer reservoir in said circuit means between said filter and said machining means;
   wherein the flow capacity of said filter is greater than the rate of usage of liquid by said machining means;
   wherein said intermittent operating means comprises means measuring upper and lower limiting values of the volume of liquid in said reservoir, and a control unit starting operation of said filter when the volume of liquid in said buffer reservoir reaches said lower limiting value and stopping operation of said filter when the volume of liquid in said buffer reservoir reaches said upper limiting value; and
   wherein said intermittent operating means comprises means for measuring the time necessary for said reservoir to fill when said filter is in operation and means for comparing the measured time to a reference value memorized by said comparing means representative of clogging of said filter.

2. The apparatus according to claim 1, wherein said reference value employed by said comparing means is a predetermined maximum value memorized by said comparing means adequate to assure that said flow capacity of said filter, while varying in dependence upon the degree of contamination of said filter, is greater than the rate of usage of liquid by said machining means; and wherein said apparatus further comprises an alarm actuated by said comparing means when said measured time exceeds said reference value.

3. A process for continuously supplying and recycling a machining liquid, comprising the steps of:
   providing a reservoir for containing machining liquid;
   providing machining means for utilizing machining liquid;
   fluidly connecting said reservoir to said machining means through a disposeable one-way flow filter made of paper or of paper having a face impregnated with a polymer; and
   successively stopping and restarting operation of said filter in order to extend the life of said filter by successive rest periods, while simultaneously employing an auxiliary means for continuously supplying filtered liquid to said machining means during the time operation of said filter is stopped.

4. The process according to claim 3, comprising connecting a second filter between said reservoir and said machining menas in parallel with said first-mentioned filter, and starting operation of one of said filters while simultaneously stopping operation of the other of said filters at predetermined time intervals to provide said successive rest periods 5. A process according to claim 3, comprising providing a buffer reservoir between said filter and said machining means, said filter having a flow capacity greater than the rate of usage of liquid by said machining means; and further comprising starting operation of said filter when the volume of liquid in said buffer reservoir reaches a lower limiting value and stopping operation of said filter when the volume of liquid in said buffer reservoir reaches an upper limiting value.

6. A process according to claim 5, comprising measuring the time necessary for said buffer reservoir to fill when said filter is in operation and comparing the measured time to a reference value representative of clogging of said filter.

7. A process according to claim 6, comprising employing a reference value which is a predetermined maximum value adequate to assure that said flow capacity of said filter, while varying in dependence upon the degree of contamination of said filter, is greater than the rate of usage of liquid by said machining means; and comprising actuating an alarm when said measured time exceeds said reference value.

* * * * *